May 11, 1948.  P. J. BROWNSCOMBE  2,441,468
SPEED INDICATOR
Filed Nov. 4, 1944
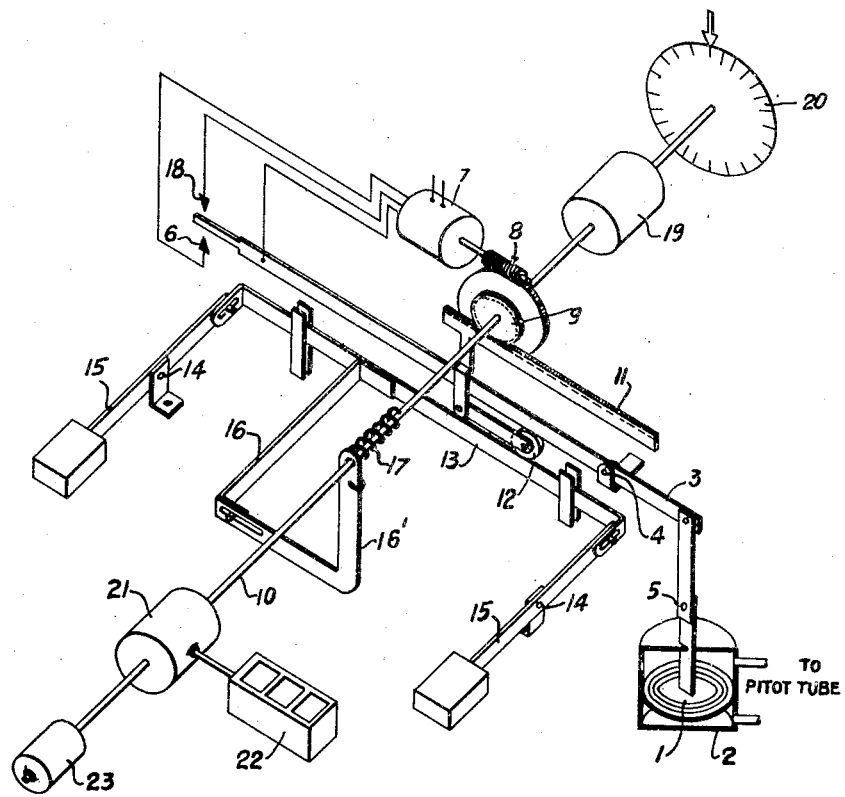
INVENTOR.
*Philip J. Brownscombe,*
BY
*Edward L. Mueller*
ATTORNEY Patented May 11, 1948

2,441,468

UNITED STATES PATENT OFFICE 2,441,468

SPEED INDICATOR

Philip J. Brownscombe, Brooklyn, N. Y., assignor to Control Instrument Company, Inc., Brooklyn, N. Y., a corporation of New York Application November 4, 1944, Serial No. 561,908

3 Claims. (Cl. 318—32)

1

The present invention relates to improvements in indicating devices such as may be employed on ships or on carriers relative to which a fluid moves, and has particular reference to a device of this character employing a Pitot tube.

Indicators of this type generally employ means for sensing the pressure developed by the Pitot tube and additional means for translating this pressure into a measurement of force such as an indication of the speed of travel of a ship. Many such devices developed for this purpose have used mercury columns or pressure balancing pumps and have been found cumbersome and unreliable in the accuracy of their indications.

In accordance with the present invention, an improved indicating device is proposed which is simple and compact in construction and which will be more accurate in the measurement of low speeds, for example, and will cover a wider range of speed than existing equipment.

In carrying out the invention, it is proposed to employ a displaceable means for balancing Pitot tube pressure, and to obtain a displacement equal to the square root of the pressure exerted on said means.

The inventive idea involved is capable of receiving a variety of expressions, one of which, for purposes of illustration, is shown in the accompanying drawing; but it is to be expressly understood that said drawing is employed only to illustrate the invention as a whole and not to define the limits thereof, reference being had to the appended claims for this purpose.

In the drawing the figure is a schematic diagram illustrating the arrangement of the parts of an indicating device embodying the characteristic features of the present invention.

Referring more particularly to the drawing, the numeral 1 indicates a diaphragm mounted in a casing 2 to which is connected the dynamic and static elements of a Pitot tube (not shown) of any conventional type.

The apparatus comprising the invention is shown in its neutral position which, in an indicating device for measuring speed of a ship for example, is assumed at either zero or constant velocity. When pressure increases on the dynamic side of the diaphragm 1, due to an increase in speed, a lever 3 pivoted at 4 adjacent one end thereof is rocked about said pivot through the link connection 5 with said diaphragm. This causes the opposite end of the lever to engage the lower contact 6 of a circuit for the reversible follow-up motor 7, thereby operating the same in the proper direction for an increase in speed. Through suit-

2 able gearing 8 driven by said motor, a pinion 9 on the shaft 10 is rotated clockwise so as to rotate said shaft and thus linearly move the rack 11 to the left, as viewed in the drawing, to thereby correspondingly move a contact roller 12 pivotally suspended from said rack. In this manner, the roller 12 is moved along the lever 3 to vary the distance between said roller and the pivot 4 of said lever. The roller 12 is interposed between the lever 3 and a parallel pressure arm 13 which is carried by weighted counterbalancing levers 15 pivoted at 14. Intermediate its ends, the arm 13 carries another arm 16 to which one end of a link 16' is joined by a pin and slot connection and at its other end is loosely connected to the shaft 10. Secured to said link is one end of a displaceable torsion spring 17, the other end of which is attached to said shaft. Thus, as the latter is rotated in a clockwise direction and the arm 13 is depressed by reason of the force exerted by roller 12 thereagainst, the spring 17 will be wound up by said shaft to increase its torque and therefore exert, through the link 16', an upward force upon the arm 13 which resists the downward force upon said arm exerted by the lever 3 through the roller 12. As long as the downward force of said lever is in excess of the force exerted by the torque of the spring 17 through the link 16' to the arm 13, the contact 6 will remain closed and the motor 7 will continue to run; but when said forces become balanced, the torque about the pivot 4 exerted by the torsion spring 17 will be equal to the torque exerted about the said pivot by the link connection 5, as when a ship attains a constant speed, and the lever 3 will be restored to its neutral position and thus open the circuit for the said motor.

Conversely, upon a decrease in speed of the ship with a consequent decrease in pressure upon the dynamic side of the diaphragm 1, the lever 3 will be rocked clockwise about its pivot 4 and thus close the upper contact 18 of the motor circuit, with the result that the motor will be driven to reverse the direction of rotation of the pinion 9 and thus move the rack 11 and its roller 12 towards said pivot 4. The shaft 10, now rotating counterclockwise, shortens the effective distance between the pivot 4 and roller 12, and, unwinds the spring 17 so as to decrease the upward force upon the arm 13. This continues until the torque caused by the perssure arm 13, acting through the roller 12 on the lever 3 about the pivot 4 is equal and opposite to the turning moment on the lever 3 about the said pivot 4 caused by the decrease in speed, whereupon the lever 3 restores to neutral and opens, at the contact 18, the energizing circuit for the motor 7.

The shaft 10 is coupled to and drives a synchronous transmitter conventionally indicated at 19, and rotated by said transmitter is a dial 20 by means of which there is obtained a linear measurement of the speed of the ship.

From the foregoing, it will be understood that since the distance of the roller 12 from the pivot 4 and the upward force on said roller by the arm 13 are both proportional to the motor displacement, the torque applied to the lever 3 and force applied to the diaphragm 1 are proportional to the square of the motor displacement. Therefore, the synchronous transmitter displacement is proportional to the ship's speed which is proportional to the square root of the Pitot tube pressure difference.

By utilizing anti-friction bearings in the above described apparatus, it can be made sensitive to very small pressures, and at the same time, resist large pressures, thereby giving a wide speed range with accuracy at low speeds. A further advantage is that all displacements are proportional to speed and not to pressure which is a square function.

To obtain an output of distance traveled, any desired form of integrator, generally indicated at 21 and connected to a convenient counter 22, may take the rate of speed of the ship from the angular position of the shaft 10 and be driven by the constant speed motor indicated at 23.

What is claimed is:

1. In an indicating device adapted for obtaining measurements from pressure generated by a Pitot tube, said device comprising a pivoted element responsive to said pressure and having a neutral position, a source of power controlled by said pivoted element when the latter is moved from said neutral position, means for so controlling said source of power, a shaft driven by said source of power, a movable member contacting said pivoted element and geared to said shaft for movement along said pivoted element and relative to the pivot thereof, a pressure arm contacting said movable member and relative to which the latter is movable, a resilient element secured to said shaft, and a link supported by said shaft and connected to said pressure arm and to which said resilient element is joined.

2. In an indicating device adapted for obtaining measurements from pressure generated by a Pitot tube, said device comprising a movable element responsive to said pressure and having a neutral position, a reversible electric motor and circuit therefor controlled by the movements of said element, a shaft operated by said motor when said movable element is moved from its neutral position, a member actuated by said shaft and moved relative to said movable element for resisting movements of the latter from its neutral position, a pressure member to which the relative movements of said shaft actuated member are transmitted, weighted counterbalancing levers pivotally connected at spaced points to said pressure member, a torsion spring coiled about and having one end secured to said shaft, and means connecting the other end of said spring to said pressure member.

3. In an indicating device adapted for obtaining measurements from pressure generated by a Pitot tube, said device comprising a pivoted element responsive to said pressure and having a neutral position, a reversible electric motor and circuit therefor controlled by the movements of said element about its pivot, gearing driven by said motor, a shaft operated by said gearing when said pivoted element is moved from said neutral position, a rack operated by said gearing for movement along said pivoted element, a roller pivotally connected to said rack for engagement with said pivoted element and for movement toward and away from the pivot thereof under the control of said rack to resist movements of said pivoted element from its neutral position, a pressure member also engaging said roller and to which the relative movements of the latter are transmitted, counterbalancing means pivotally connected to said pressure member, a torsion spring coiled about and having one end secured to said shaft, a link supported by said shaft and having angular movements thereabout as an axis and to which the other end of said spring is connected, and means joining said link to said pressure member.

PHILIP J. BROWNSCOMBE.

REFERENCES CITED

The following references are of record in the file of this patent:

UNITED STATES PATENTS

| Number | Name | Date |
|---|---|---|
| 1,732,434 | Dawley | Oct. 22, 1929 |
| 1,968,539 | Rydberg | July 31, 1934 |
| 2,107,976 | Blasig | Feb. 8, 1938 |
| 2,132,338 | Ziebolz | Oct. 4, 1938 |
| 2,151,941 | Rydberg | Mar. 28, 1939 |
| 2,190,506 | Wurr | Feb. 13, 1940 |
| 2,325,714 | Stover | Aug. 3, 1943 |
| 2,354,423 | Rosenberger | July 25, 1944 |